(12) United States Patent
Guillez et al.

(10) Patent No.: US 6,921,124 B2
(45) Date of Patent: Jul. 26, 2005

(54) VEHICLE RETRACTABLE ROOF WITH PIVOTING ELEMENTS, SLIDING WITH TWO ARMS

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/416,326

(22) PCT Filed: Nov. 6, 2001

(86) PCT No.: PCT/FR01/03434
§ 371 (c)(1),
(2), (4) Date: May 6, 2003

(87) PCT Pub. No.: WO02/36376
PCT Pub. Date: May 10, 2002

(65) Prior Publication Data
US 2004/0036314 A1 Feb. 26, 2004

(30) Foreign Application Priority Data
Nov. 6, 2000 (FR) .......................... 00 14186

(51) Int. Cl.⁷ ............................... B60T 7/00
(52) U.S. Cl. .................. 296/108; 296/107.17
(58) Field of Search ............ 296/108, 107.01, 296/107.16, 107.17, 107.18, 107.19, 107.2, 107.08, 121

(56) References Cited

U.S. PATENT DOCUMENTS

| | | | | |
|---|---|---|---|---|
| 6,422,637 B1 * | 7/2002 | Mac Farland | .......... | 296/107.15 |
| 6,425,622 B2 * | 7/2002 | Eberle | .......... | 296/108 |
| 6,663,164 B1 * | 12/2003 | Guillez et al. | .......... | 296/108 |
| 6,688,670 B2 * | 2/2004 | Biecker et al. | .......... | 296/107.18 |
| 6,767,044 B2 * | 7/2004 | Tohda et al. | .......... | 296/107.01 |
| 6,767,046 B1 * | 7/2004 | Guillez et al. | .......... | 296/108 |
| 2003/0197395 A1 * | 10/2003 | Reinsch | .......... | 296/107.08 |
| 2004/0021338 A1 * | 2/2004 | Guillez et al. | .......... | 296/108 |
| 2004/0041434 A1 * | 3/2004 | Guillez | .......... | 296/107.2 |
| 2004/0061354 A1 * | 4/2004 | Guillez et al. | .......... | 296/108 |
| 2004/0061355 A1 * | 4/2004 | Guillez et al. | .......... | 296/108 |
| 2004/0090082 A1 * | 5/2004 | Guillez et al. | .......... | 296/108 |
| 2004/0113453 A1 * | 6/2004 | Guillez et al. | .......... | 296/107.2 |

* cited by examiner

*Primary Examiner*—H. Gutman
(74) *Attorney, Agent, or Firm*—Nawrocki, Rooney & Sivertson, P.A.

(57) ABSTRACT

A retractable roof for a vehicle, comprising a front roof element, an intermediate roof element and a rear roof element. These three elements can move between positions in which they cover the vehicle cabin, to ones in which they horizontally cover the rear boot of the vehicle. Linkages are provided to move these three elements from one set of positions to the other.

7 Claims, 1 Drawing Sheet

VEHICLE RETRACTABLE ROOF WITH PIVOTING ELEMENTS, SLIDING WITH TWO ARMS

BACKGROUND OF THE INVENTION

The present invention concerns a roof which can be retracted or withdrawn into the rear boot of a vehicle.

Such a retractable roof makes it possible in particular to convert a vehicle of the two-seater coupe or four-seater coupe or saloon type into a vehicle of the cabriolet type.

In the case of four-seater coupes or saloons, the roof has a relatively long length, so that the retractable roof is composed of three elements, each of which has a length compatible with the dimensions of the vehicle boot.

Thus a retractable roof for a vehicle is known, comprising a front roof element, an intermediate roof element and a rear roof element, these three elements being able to move between a position in which they cover the vehicle cabin and a position in which they are superimposed substantially horizontally in the rear boot of the vehicle.

BRIEF SUMMARY OF THE INVENTION

The aim of the present invention is to afford improvements to the known means, in order to optimally control and guide the movement of the roof elements between their closure position and their position of storage in the boot.

According to the invention, the retractable roof is characterised in that the movement of the rear element towards the boot is controlled by at least one arm articulated on the chassis of the vehicle and on the rear element, in that the front of the rear element is connected in an articulated fashion to the intermediate element by a first lever, a second lever connecting the intermediate element in an articulated fashion to a fixed articulation point on the chassis, in that the intermediate element comprises a slide extending between its front and rear edges, a finger fixed to the rear of the front element being engaged in the said slide so that the element can slide on the intermediate element, in that the front part of the intermediate element is connected in an articulated fashion to the front element by a lever, this lever itself being connected in an articulated fashion to the said second lever by a link, and in that connection means are provided between the arm and the second lever or between the arm and one of the levers connecting the rear element to the intermediate element or between the latter lever and a fixed articulation point on the chassis.

Other particularities and advantages of the invention will also emerge from the following description.

BRIEF DESCRIPTION OF THE INVENTION

In the accompanying drawings, given by way of non-limiting examples:

DETAILED DESCRIPTION OF THE INVENTION

Figure 1:
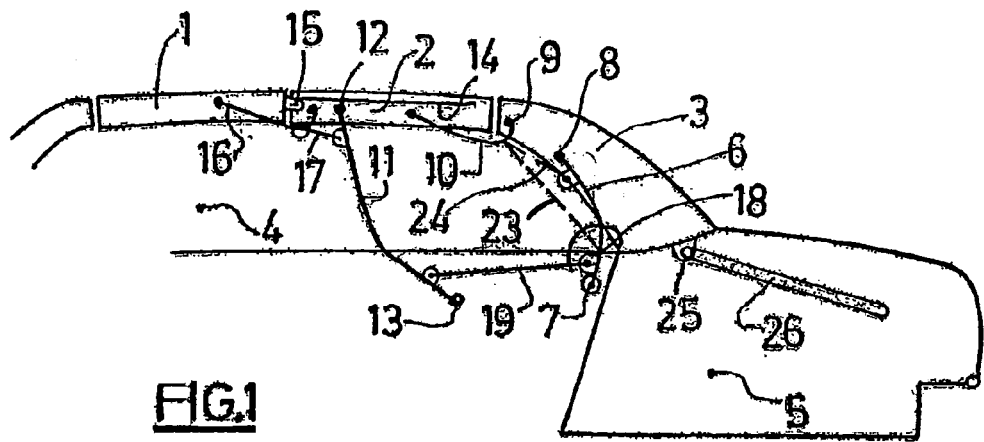
FIG. 1 is a schematic view in partial longitudinal section of a vehicle equipped with a retractable roof according to the invention, in the closed position.
Figure 2:
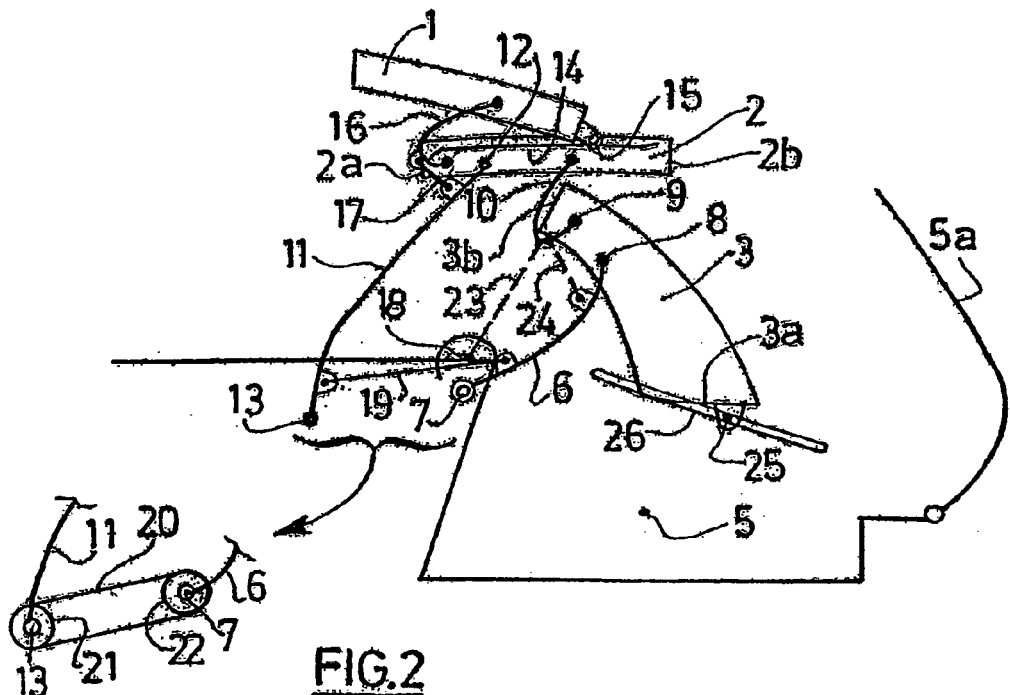
FIG. 2 is a view similar to FIG. 1, the retractable roof being in an intermediate position.
Figure 3:
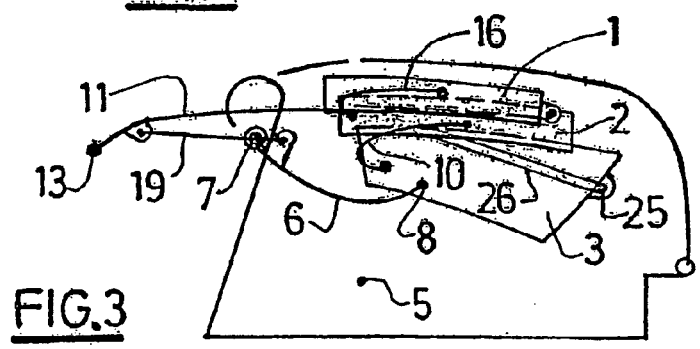
FIG. 3 is a view similar to FIGS. 1 and 2, the retractable roof being in the position stored in the vehicle boot.

In the embodiment depicted in FIGS. 1 to 3, the retractable roof comprises a front roof element 1, an intermediate roof element 2 and a rear roof element 3. These three elements 1, 2, 3 are able to move between a position in which (see FIG. 1) they cover the cabin 4 of the vehicle and a position in which (see FIG. 3) they are superimposed substantially horizontally in the rear boot 5 of the vehicle.

In accordance with the invention, the movement of the rear element 3 towards the boot 5 is controlled by an arm 6 articulated at 7 on the vehicle chassis and at 8 on the rear element 3 and the front 3b of the rear element 3 is connected in an articulated fashion at 9 on the intermediate element 2 by a first lever 10, a second lever 11 connecting the intermediate element 2 in an articulated fashion at 12 to a fixed articulation point 13 on the chassis.

The intermediate element 2 comprises a slide extending between its front 2a and rear 2b edges. A finger 15 fixed to the rear of the front element 1 is engaged in the slide 14 so that the front element 1 can slide on the intermediate element 2.

In addition, the front part 2a of the intermediate element 2 is connected in an articulated fashion to the front element 1 by a lever 16. This lever 16 is itself connected in an articulated fashion to the said second lever by a link 17.

Moreover, connection means are provided between the arm 6 and the second lever 11 or between the arm 6 and one 10 of the levers connecting the rear element 3 to the intermediate element 2 or between the latter lever 10 and a fixed articulation point 18 on the chassis.

In a first version the aforementioned connection means comprise a link 19 articulated on the arm 6 and on the second lever 11. This link 19 can be replaced (see FIG. 2) by a chain 20 or a notched belt wound around two gears 21, 22 mounted on the shafts 13, 7 of the lever 11 and of the arm 6 and fixed to these.

In a second version, a lever 23 is articulated on the lever 10 connecting the rear element 3 and the intermediate element 2 to a fixed articulation point 18 on the chassis.

In a third version, the connection means comprise a link 24 articulated on the arm 6 and on the lever 10 connecting the rear 3 and intermediate 2 elements.

In the example depicted, the movement of the rear element 3 towards the boot 5 is also controlled by a finger 25 carried by the rear part 3a of the rear element 3 slidably engaged in a slide 26 extending inside the boot 5.

Instead of the finger 25 and the slide 26, the movement of the rear element 3 towards the boot 5 can be controlled by a second arm articulated on the chassis and on the rear part 3a of the rear element 3.

The retractable roof which has just been described functions as follows:

After unlocking of the elements 1, 2, 3 and opening of the lid 5a of the boot 5, the pivoting of the arm 6 towards the rear controlled by a motor or an actuator moves the rear element 3 towards the boot 5. The movement of the element 3 is guided by the finger 25, which slides along the slide 26.

The pivoting of the arm 6 causes the tilting of the levers 10 and 11 by virtue of the connection means, such as the link 19, or 23, or 24, or the transmission chain 20.

The movement of the levers 10 and 11 raises the intermediate element 2, making it pass over the rear element 3, as indicated in FIG. 2.

The pivoting of the lever 11 causes the tilting of the lever 16 by virtue of the link 17, which raises the front element 1 and pushes the front finger 15 on the latter in the slide 14 of the element 2.

The front element 1 is thus progressively superimposed whilst sliding on the intermediate element 2.

The movement thus continues until the elements 1, 2, 3 are stored substantially horizontally one on top of the other in the boot 5, as shown by FIG. 3.

What is claimed is:

1. A retractable roof for a vehicle, comprising a front roof element (1), an intermediate roof element (2) and a rear roof element (3), these three elements being able to move between a position in which they cover the vehicle cabin (4) and a position in which they are superimposed substantially horizontally in the rear boot (5) of the vehicle, characterized in that the movement of the rear element (3) towards the boot is controlled by at least one arm (6) articulated on the chassis of the vehicle, in that the front of the rear element (3) is connected in an articulated fashion to the intermediate element (2) by a first lever (10), a second lever (11) connecting the intermediate element (2) in an articulated fashion to a fixed articulation point (13) on the chassis, in that the intermediate element (2) comprises a slide (14) extending between its front and rear edges, a finger (15) fixed to the rear of the front element (1) being engaged in said slide (14) so that the front element (1) can slide on the intermediate element (2), in that the front part of the intermediate element (2) is connected in an articulated fashion to the front element (1) by a lever (16), the lever (16) itself being connected in an articulated fashion to said second lever (11) by a link (17), and in that connection means are provided between the arm (6) and the second lever (11) or between the arm (6) and first lever (10) connecting the rear element (3) to the intermediate element (2) or between the first lever (10) and a fixed articulation point (18) on the chassis.

2. A retractable roof according to claim 1, characterized in that said connection means comprise a link (19) articulated on the arm (6) and on the second lever (11).

3. A retractable roof according to claim 1, characterized in that said connection means comprise a lever (23) articulated on first lever (10) connecting the rear element (3) and the intermediate element (2) and articulated at a fixed point (18) on the chassis.

4. A retractable roof according to claim 1, characterized in that said connection means comprise a link (24) articulated on the first arm (6) and on first lever (10) connecting the rear (3) and intermediate (2) elements.

5. A retractable roof according to claim 1, characterized in that said connection means comprise a chain (20) or a notched belt wound around two gears (21, 22) mounted on the pivot shafts (13, 7) of the second lever (11) and arm (6) and fixed thereto.

6. A retractable roof according to claim 1, characterize in that the movement of the rear element (3) towards the boot (5) is also controlled by a finger (25) carried by the rear part (3a) of the rear element (3) slidably engaged in a slide (26) extending inside the boot (5).

7. A retractable roof according to claim 1, characterized in that the movement of the rear element (3) towards the boot (5) is also controlled by a second slide articulated on the chassis and a second finger on the rear part (3a) of the rear element (3).

* * * * *